United States Patent
Eslami

(10) Patent No.: US 9,294,782 B1
(45) Date of Patent: Mar. 22, 2016

(54) IMAGE PROCESSING SYSTEM WITH ARTIFACT REDUCTION MECHANISM AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/525,524

(22) Filed: Oct. 28, 2014

(51) Int. Cl.
G06K 9/36 (2006.01)
H04N 19/63 (2014.01)
H04N 19/176 (2014.01)

(52) U.S. Cl.
CPC ............. *H04N 19/63* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 6,154,493 A | 11/2000 | Acharya et al. | |
| 6,272,180 B1 | 8/2001 | Lei | |
| 6,356,665 B1 | 3/2002 | Lei et al. | |
| 6,546,143 B1 | 4/2003 | Taubman et al. | |
| 6,801,665 B1 * | 10/2004 | Atsumi | H04N 19/70 375/E7.056 |
| 6,865,291 B1 | 3/2005 | Zador | |
| 6,965,700 B2 | 11/2005 | Pearlman et al. | |
| 7,006,697 B1 | 2/2006 | Gormish et al. | |
| 7,120,307 B2 | 10/2006 | Malvar | |
| 7,142,722 B2 | 11/2006 | Fukuhara et al. | |
| 7,248,735 B2 | 7/2007 | Funakubo | |
| 7,308,402 B2 | 12/2007 | Zhou et al. | |
| 7,315,651 B2 | 1/2008 | Sakuyama et al. | |
| 7,376,279 B2 | 5/2008 | Dekel et al. | |
| 7,397,963 B2 | 7/2008 | Schwartz | |
| 7,412,102 B2 | 8/2008 | Srinivasan et al. | |
| 7,421,137 B2 | 9/2008 | Taubman | |
| 7,454,074 B2 | 11/2008 | Dekel et al. | |
| 7,492,955 B2 | 2/2009 | Zandi et al. | |
| 7,545,988 B2 | 6/2009 | Meeker | |
| 7,574,056 B2 * | 8/2009 | Funakubo | G06T 9/005 382/166 |
| 7,623,577 B2 | 11/2009 | Kim et al. | |
| 7,634,145 B2 | 12/2009 | Keith et al. | |
| 7,656,561 B2 | 2/2010 | Molgaard et al. | |
| 7,949,044 B2 | 5/2011 | Winger et al. | |

(Continued)

FOREIGN PATENT DOCUMENTS

WO  WO-0049571 A2  8/2000

OTHER PUBLICATIONS

U.S. Appl. No. 14/525,364, filed Oct. 28, 2014, Eslami.

(Continued)

*Primary Examiner* — Li Liu
(74) *Attorney, Agent, or Firm* — Ishimaru & Associates LLP

(57) ABSTRACT

An image processing system, and a method of operation thereof, including: a capture device for obtaining a base input image; and an image signal processing hardware including: a pre-processing module for: partitioning the base input image into base image blocks, generating an input image block based on the base image blocks, inverting the input image block associated with some of the positions within the base input image; a wavelet transform module for generating a transformed image block based on the input image block; a coding module for generating a scaled wavelet block based on the transformed image block, the coding module for generating a compressed image block based on the scaled wavelet block; and a decoding module and an inverse wavelet transform module for generating an output image block by decoding and performing an inverse wavelet transform on the compressed image block for display on a display device.

20 Claims, 7 Drawing Sheets

(56) References Cited

U.S. PATENT DOCUMENTS

| | | |
|---|---|---|
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2003/0123742 A1 | 7/2003 | Zhao et al. |
| 2005/0131660 A1 | 6/2005 | Yadegar et al. |
| 2008/0253463 A1* | 10/2008 | Lin .................. H04N 19/176 375/240.25 |
| 2010/0046628 A1 | 2/2010 | Bhaskaran et al. |
| 2011/0292247 A1 | 12/2011 | Gharavi-Alkhansari et al. |
| 2012/0200669 A1 | 8/2012 | Lai et al. |
| 2012/0307904 A1 | 12/2012 | Yi et al. |
| 2014/0169693 A1 | 6/2014 | Kuo et al. |

OTHER PUBLICATIONS

U.S. Appl. No. 14/525,474, filed Oct. 28, 2014, Eslami.
U.S. Appl. No. 14/525,556, filed Oct. 28, 2014, Eslami.
U.S. Appl. No. 14/525,611, filed Oct. 28, 2014, Eslami.
U.S. Appl. No. 14/525,657, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

FIG. 4

IMAGE PROCESSING SYSTEM WITH ARTIFACT REDUCTION MECHANISM AND METHOD OF OPERATION THEREOF

CROSS-REFERENCE TO RELATED APPLICATION(S)

The present application contains subject matter related to a concurrently filed U.S. Patent Application by Ramin Eslami entitled "IMAGE PROCESSING SYSTEM WITH BIT-STREAM REDUCTION AND METHOD OF OPERATION THEREOF". The related application is assigned to Sony Corporation and is identified by Ser. No. 14/525,364. The subject matter thereof is incorporated herein by reference thereto.

The present application contains subject matter related to a concurrently filed U.S. Patent Application by Ramin Eslami entitled "IMAGE PROCESSING SYSTEM WITH BINARY DECOMPOSITION AND METHOD OF OPERATION THEREOF". The related application is assigned to Sony Corporation and is identified by Ser. No. 14/525,474. The subject matter thereof is incorporated herein by reference thereto.

The present application contains subject matter related to a concurrently filed U.S. Patent Application by Ramin Eslami entitled "IMAGE PROCESSING SYSTEM WITH CODING MODE AND METHOD OF OPERATION THEREOF". The related application is assigned to Sony Corporation and is identified by Ser. No. 14/525,556. The subject matter thereof is incorporated herein by reference thereto.

The present application contains subject matter related to a concurrently filed U.S. Patent Application by Ramin Eslami entitled "IMAGE PROCESSING SYSTEM WITH CONDITIONAL CODING AND METHOD OF OPERATION THEREOF". The related application is assigned to Sony Corporation and is identified by Ser. No. 14/525,611. The subject matter thereof is incorporated herein by reference thereto.

The present application contains subject matter related to a concurrently filed U.S. Patent Application by Ramin Eslami entitled "IMAGE PROCESSING SYSTEM WITH BINARY ADAPTIVE GOLOMB CODING AND METHOD OF OPERATION THEREOF". The related application is assigned to Sony Corporation and is identified by Ser. No. 14/525,657. The subject matter thereof is incorporated herein by reference thereto.

The present application contains subject matter related to a concurrently filed U.S. Patent Application by Ramin Eslami entitled "IMAGE PROCESSING SYSTEM WITH JOINT ENCODING AND METHOD OF OPERATION THEREOF". The related application is assigned to Sony Corporation and is identified by Ser. No. 14/526,120. The subject matter thereof is incorporated herein by reference thereto.

TECHNICAL FIELD

The embodiments of the present invention relate generally to an image processing system, and more particularly to a system for reducing artifacts in compressed images.

BACKGROUND ART

Existing data networks experience ever-increasing demands on them due to the proliferation of embedded, mobile, and otherwise internet-connected devices. The rapid increase of mobile devices has also placed great demands on wireless data networks. A large part of this increased demand is due to streaming audio or video.

Streaming video places heavy demands on available bandwidth due to the high volume of data required. Thus, compression of video or audio data becomes necessary. Many different data compression codecs (coder-decoder) for audio and video exist, with various levels of efficiency. However, not all codecs are equally efficient, and as wireless networks get more congested, and data usage caps become more common, continuous improvement in compression ratios, especially for streaming and on-demand video, is desired.

Thus, a need still remains for a better encoding method. In view of the rapid rise in the consumption of on-demand video, it is increasingly critical that answers be found to these problems. Growing consumer expectations and diminishing opportunities for meaningful product differentiation in the marketplace make it critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The embodiments of the present invention provide a method of operation of an image processing system that includes: obtaining a base input image with a capture device; partitioning the base input image into base image blocks, each of the base image blocks having a position within the base input image; generating an input image block based on the base image blocks, the input image block generated as a one-dimensional image block; inverting the input image block associated with some of the positions within the base input image; generating a transformed image block based on the input image block; generating a scaled wavelet block based on the transformed image block with a scaling factor; generating a compressed image block based on the scaled wavelet block; and generating an output image block by decoding and performing an inverse wavelet transform on the compressed image block for display on a display device.

The embodiments of the present invention provide an image processing system that includes: a capture device for obtaining a base input image; and an image signal processing hardware coupled to the capture device, the image signal processing hardware including: a pre-processing module for: partitioning the base input image into base image blocks, each of the base image blocks having a position within the base input image, generating an input image block based on the base image blocks, the input image block generated as a one-dimensional image block, inverting the input image block associated with some of the positions within the base input image; a wavelet transform module coupled to the pre-processing module for generating a transformed image block based on the input image block; a coding module coupled to the wavelet transform module including a scaling correction module for generating a scaled wavelet block based on the transformed image block with a scaling factor, the coding module for generating a compressed image block based on the scaled wavelet block; and a decoding module and an inverse wavelet transform module coupled to the coding module for generating an output image block by decoding and performing an inverse wavelet transform on the compressed image block for display on a display device.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 4 is an example of the bitplanes of the wavelet coefficients of FIGS. 2 and 3.

BEST MODE FOR CARRYING OUT THE INVENTION

Figure 1:
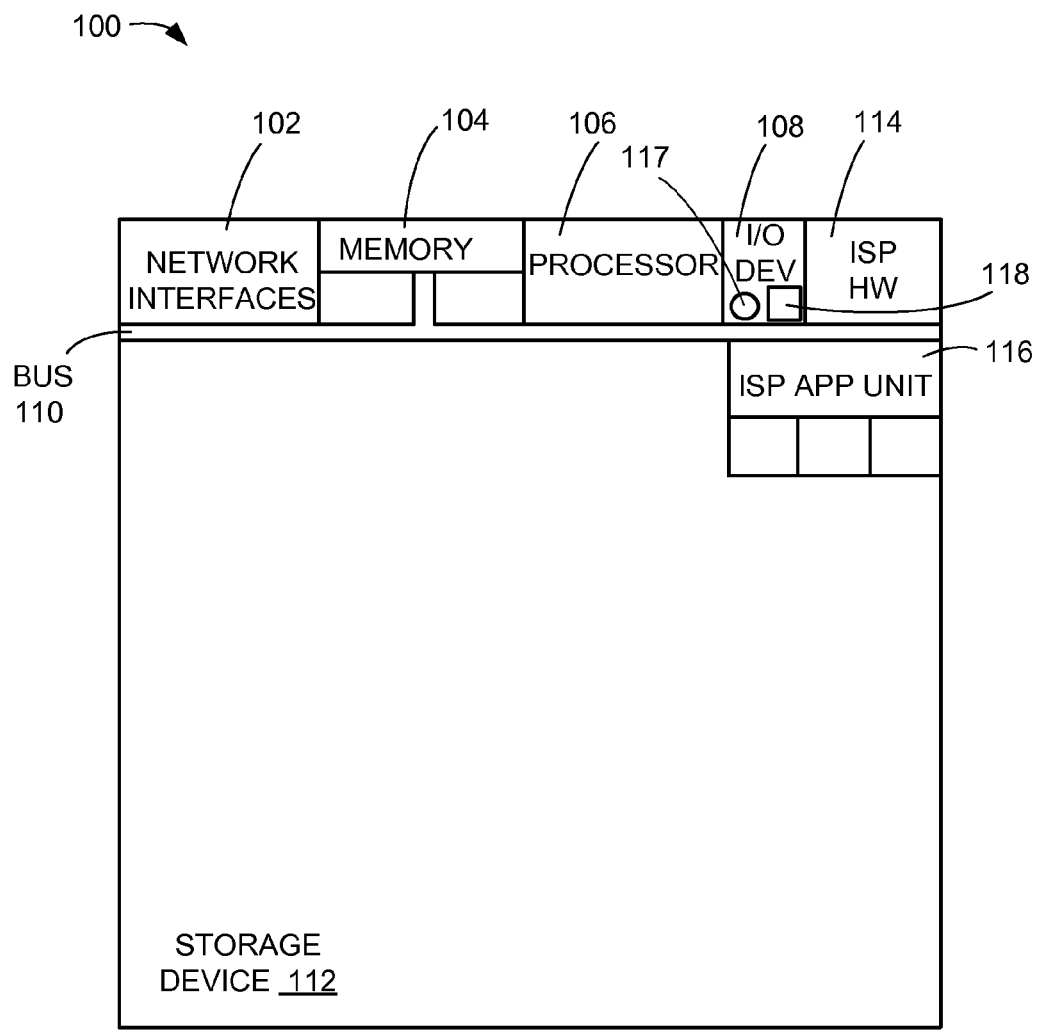
FIG. 1 is an example of a block diagram of an image processing system with coding modes in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, dedicated circuitry for a specific function, a processor, a computer, an integrated circuit, integrated circuit cores, a microelectromechanical system (MEMS), passive devices, environmental sensors including temperature sensors, or a combination thereof.

Referring now to FIG. 1, therein is shown an example of a block diagram of an image processing system 100 with coding modes in a first embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-Shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projection, CRT, or other display technologies.

The video captured by the capture device 117 can be considered as a series of images which can further be broken down into input image blocks, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns. For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118 which can display resulting video.

Regardless of how the capture device 117, the processor 106, and the display devices 118 are connected, the display devices 118 can output decoded image blocks as decoded video after processing of the input image blocks by the image signal processing hardware 114. The quality of the resulting video can be determined by the particular compression scheme used when transmitting image block data, for example.

Figure 2:
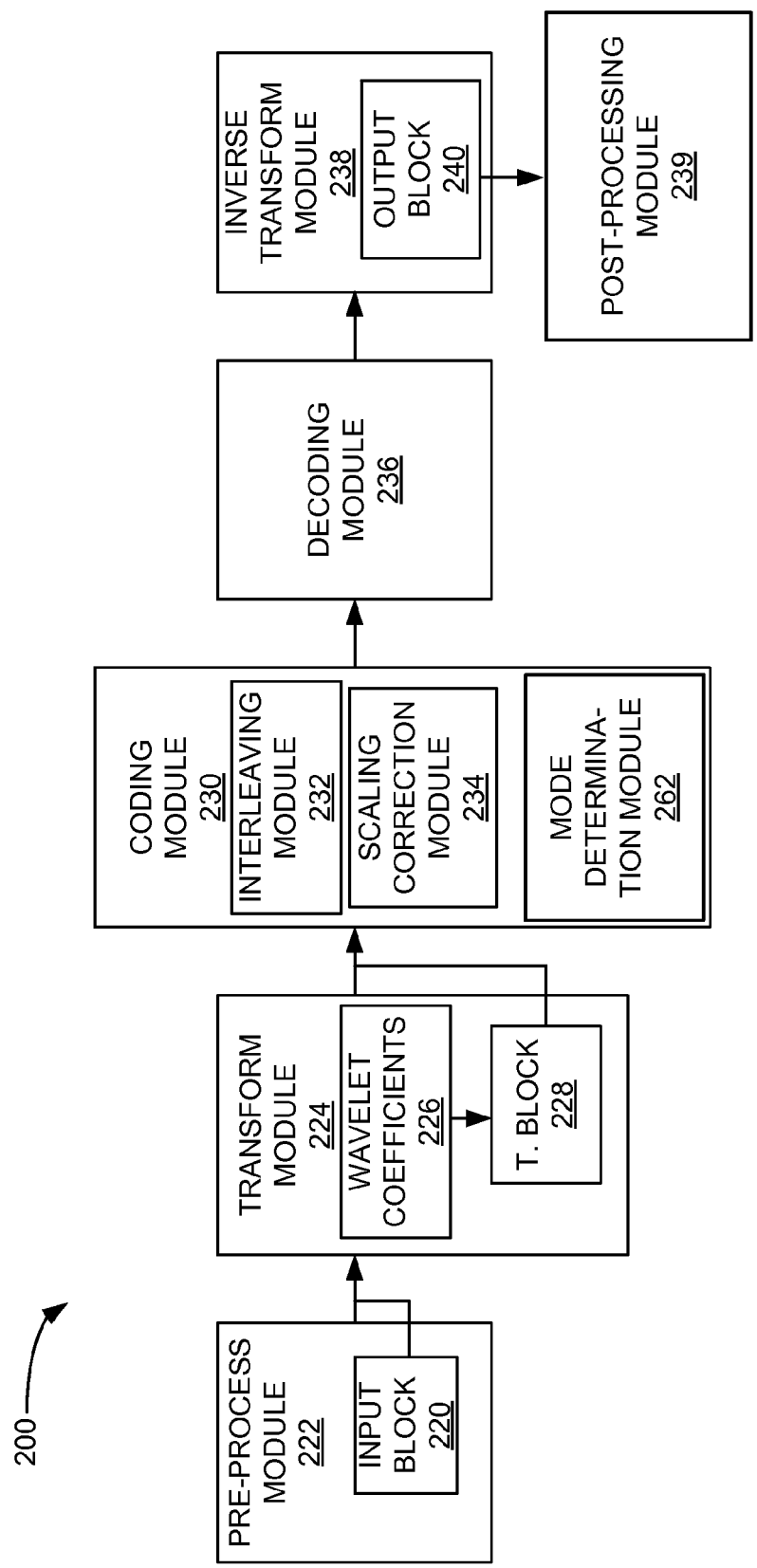
FIG. 2 is a system diagram of the image processing system in a second embodiment of the present invention.

Referring now to FIG. 2, therein is shown a system diagram of the image processing system 200 in a second embodiment of the present invention. In this embodiment, images or video are handled at the level of image blocks, which are selected portions of the images or video. An input image block 220 is generated from image information captured by the capture device 117 of FIG. 1. For example, the input image block 220 can be generated by taking a set number of pixels from the captured image information at regular intervals to cover all portions of the image information.

In this example, processing of the input image block 220 takes place in the image signal processing hardware 114 and in various processing subunits of the image signal processing hardware 114. For example, the processing subunits or modules which perform specific functions can be hardware subunits, dedicated circuitry, or modules within the image signal processing hardware 114.

A pre-processing module 222 can generate the input image block 220 where the pixels of the input image block 220 are assigned numbers and arranged in order in what is sometimes called a one-dimensional image block. The one-dimensional image block will be described in greater detail in later figures. For example, the one-dimensional image block can be formed from 32 or 64 pixels. The color components of the pixels can be used to create separate but related instances of the input image block 220. For example, in a YUV 422 formatted image, separate image blocks can contain data for the Y (or luma) channel, the U channel, or V channel (U and V are also considered the chroma channels). The input image block 220 can contain data from one or more of the channels; for example, the input image block 220 can contain only Y channel information. The pre-processing module 222 allows for easier and faster processing in later steps.

The pre-processing module 222 can also "flip" or invert the pixels of the input image block 220 before sending the input image block 220 on to later modules. The input image block 220 as a one-dimensional image block can be flipped by reversing the positions of the pixels. In other words, in a 64×1 image block, a pixel in the number 1 position will be in the number 64 position, and vice-versa, for example. A pixel in the number 2 position will be moved to the number 63 position, and so on, to continue the example. As another example, if the pixels are thought of as numbers, in a hypothetical 4-pixel image block, [2315] is flipped and becomes [5132].

The pre-processing module 222 is coupled to a wavelet transform module 224, which transforms the visual data in the pixels of the input image block 220 into wavelet coefficients 226 which can be used to create a transformed image block 228. In order to have the transformation be reversible, integer wavelet coefficients can be used, for example. As a more specific example, Daubechies 5/3 integer wavelets can be used. It has been found that this allows for visually lossless compression and for the ability to perform simple integer-based calculations, which simplifies calculations and allows for a reduction in hardware cost. The wavelet transform module 224 can also perform a decomposition step to generate various high pass and low pass bands and subbands within the ordered list of the wavelet coefficients 226. An example of the transformed image block 228 can be seen in FIG. 3.

The wavelet transform module 224 is coupled to a coding module 230, which can also be considered as a compression module. The coding module 230 can act on the wavelet coefficients 226. The coding module 230 can contain submodules including an interleaving module 232 and a scaling correction module 234. In situations where sampling of color component values is done on an unequal basis, it has been found to be helpful to interleave smaller blocks to equal the size of larger blocks. For example, in YUV 422 images, Y values are sampled twice as often as U and V values; this means that there will be twice as many of the wavelet coefficients 226 for Y as for U or V individually. Thus, the interleaving module 232 can interleave the wavelet coefficients from U and V image blocks in order to generate a transformed and interleaved image block with combined U and V information that is the same size as the transformed image block 228 which contains Y information, for example.

The values of each of the wavelet coefficients 226 can be expressed as binary values, or bits. The bits can be organized into an array with the most significant bits at the top of the array, with less significant bits listed in decreasing priority when going down the array. The array can be subdivided into bitplanes of various significance, with the most significant of the bitplanes at the top of the array. An example of the bitplanes of the wavelet coefficients 226 can be seen in FIG. 4.

The scaling correction module 234 can adjust priorities of the various subbands of the wavelet coefficients 226 within the transformed image block 228 in order to ensure proper scaling of the wavelet coefficients 226. This can have the effect of creating scaled bitplanes which can create higher priority bitplanes than previously existed. This can also generate a scaled wavelet block.

The coding module 230 can be coupled to a decoding module 236, which reverses the operations of the coding module 230 to decompress a compressed image block (the data) sent from the coding module 230 to the decoding module 236. An inverse wavelet transform module 238 can reverse the operations of the wavelet transform module 224 and generate an output image block 240. The output image block 240 can then be displayed on the display devices 118 of FIG. 1. Post processing can be done on the output image block 240 before display as necessary, in a post-processing module 239, for example.

The post-processing module 239 can be coupled to the inverse wavelet transform module 238, and can flip the ordered pixels of the output image block 240 back to the original orientation of the input image block 220 when necessary, for example. The post-processing module 239 can determine whether flipping is necessary, and can reverse the flipping done by the pre-processing module 222 to restore the original orientation of pixels.

Figure 3:
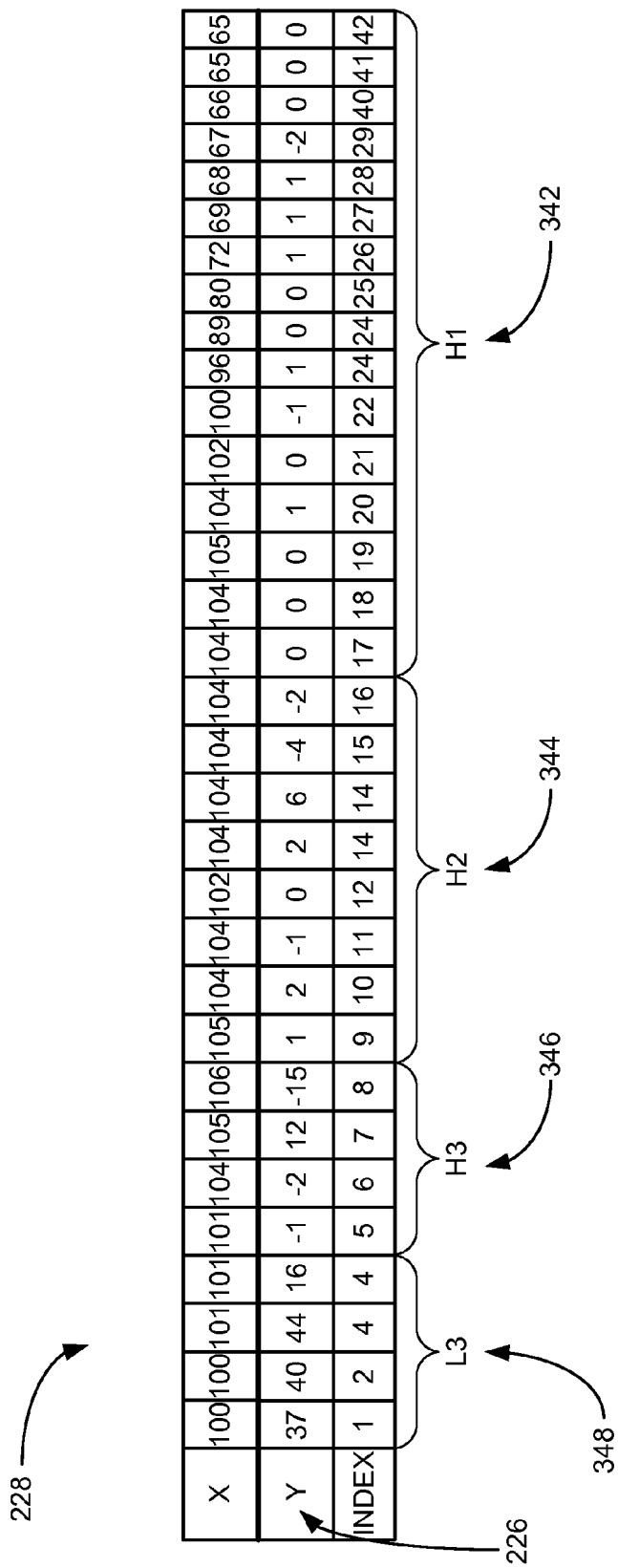
FIG. 3 is an example of the transformed image block of FIG. 2.

Referring now to FIG. 3, therein is shown an example of the transformed image block 228 of FIG. 2. It is understood that the numbers are for illustrative purposes only, and that parameters of the transformed image block 228 can be modified. For example, while the block size of the transformed image block 228 shown is 32×1 (nominally pixels), it is understood that the block size can be different such as 64×1 or other size as required by the situation.

In this example, the transformed image block 228 is the luma, or Y component of the visual data. The letter x denotes the intensity value of each pixel within a 0-255 scale, as an example. The letter y designates the wavelet coefficients 226 as determined by the wavelet transform module 224 of FIG. 2. In this example, integer wavelet coefficients are used so a reverse transform is possible. The index number is a way of tracking the wavelet coefficients 226.

Also shown in this figure are the results of cascading signal decomposition. A level one high pass subband 342 is the result of the first decomposition, and is noted by H1. A level two high pass subband 344 is the result of a second decomposition step, and is noted by H2. A level three high pass subband 346 is the result of a third decomposition, and is noted by H3. A level three low pass subband 348 is noted by L3, and is the same size as the level three high pass subband 346 as well as being a result of the third decomposition. The particular decomposition pattern is for example only, and it is understood that other types of signal decomposition are possible.

Figure 4:
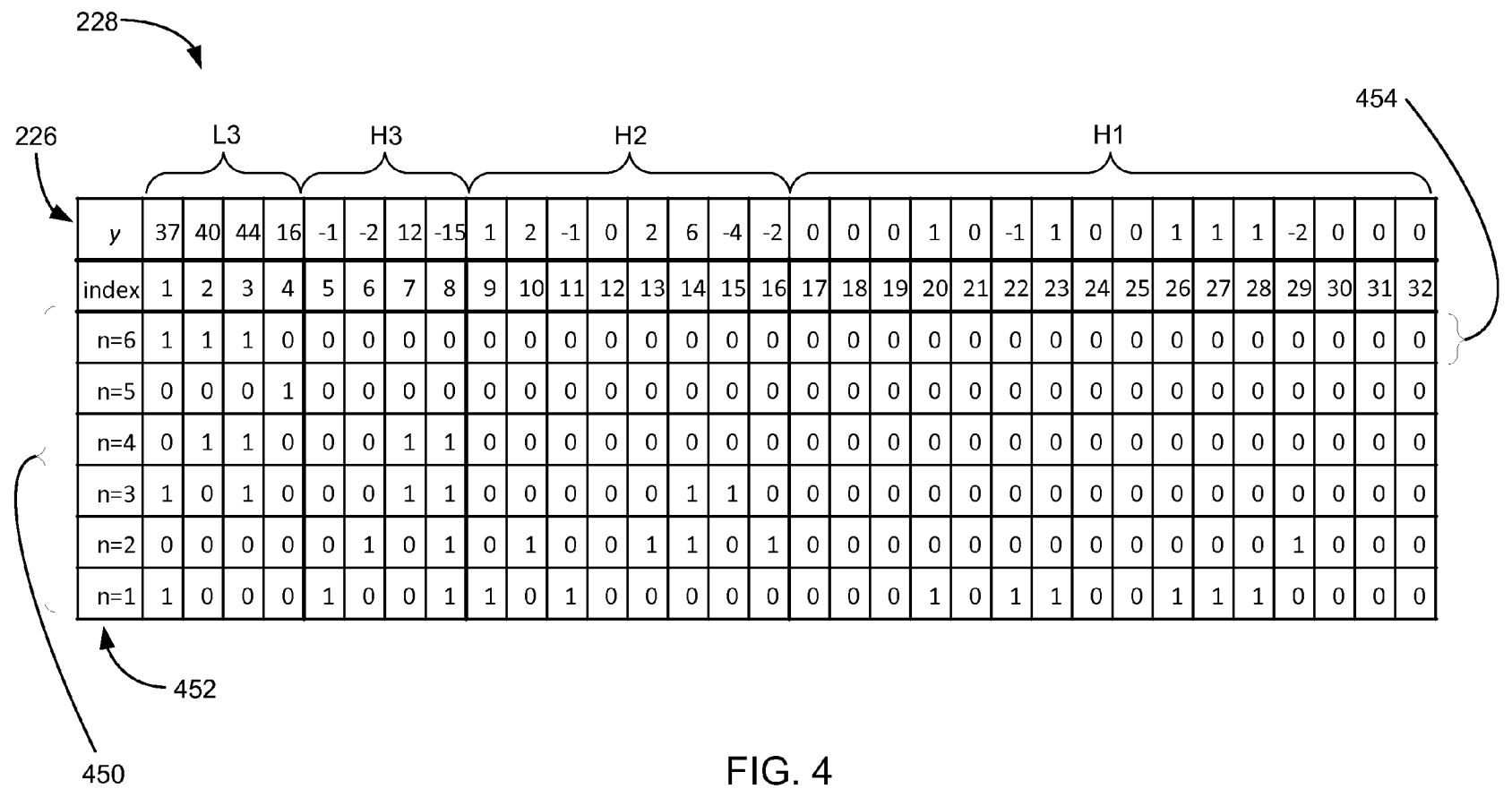

Referring now to FIG. 4, therein is shown an example of the bitplanes of the wavelet coefficients 226 of FIGS. 2 and 3. This can be considered as an expanded view of the transformed image block 228, which is the input image block 220 of FIG. 2 after going through the wavelet transform module 224 of FIG. 2. As with FIG. 3, the values are for example only. In this example, the index numbers and the wavelet coefficients 226 are shown above bitplanes 450 of the wavelet coefficients 226. The bitplanes 450 are defined as the horizontal rows of bits which represent a portion of the value of the wavelet coefficients 226. In this example, below each of the wavelet coefficients 226 is the binary representation of the value of the wavelet coefficients 226, read from the top to the bottom; for example, the binary value below the wavelet coefficient of 37 corresponding to index number 1 can be read as 100101, which is the binary representation of the number 37.

The n value is a bitplane priority value 452, with lower numbers having lower priority. For example, a most significant bitplane 454 will have the highest value for the bitplane priority value 452; in this example, the most significant bitplane 454 is the horizontal row of bits with the bitplane priority value 452 of 6 (shown as n=6). In this example, this is because 6 bits are necessary to cover all of the existing wavelet coefficient values; it is understood that the number of the bitplanes 450 can change depending on the maximum value within of the wavelet coefficients 226.

A number of scaling factors can be used as necessary to properly scale the various subbands of the bitplanes 450. If scaling is found to be necessary, the scaling of the bitplanes 450 can be performed by the scaling correction module 234 of FIG. 2 which can then output a scaled wavelet block. However, regardless of scaling, scanning and coding of the wavelet coefficients 226 acts on the bitplanes 450. The scan of the transformed image block 228 or the scaled wavelet block for compression purposes will start from the first bit (generally index number 1) of the most significant bitplane 454 and scan in order across the most significant bitplane 454 (In this example, this is n=6). Once the end of the most significant bitplane 454 is reached, the scan continues from the first bit of the next bitplane having the bitplane priority value 452 which is one less than that of the most significant bitplane 454 (in this example, this is n=5). This pattern continues until all bits have been scanned or until the bitbudget is reached.

Figure 5:
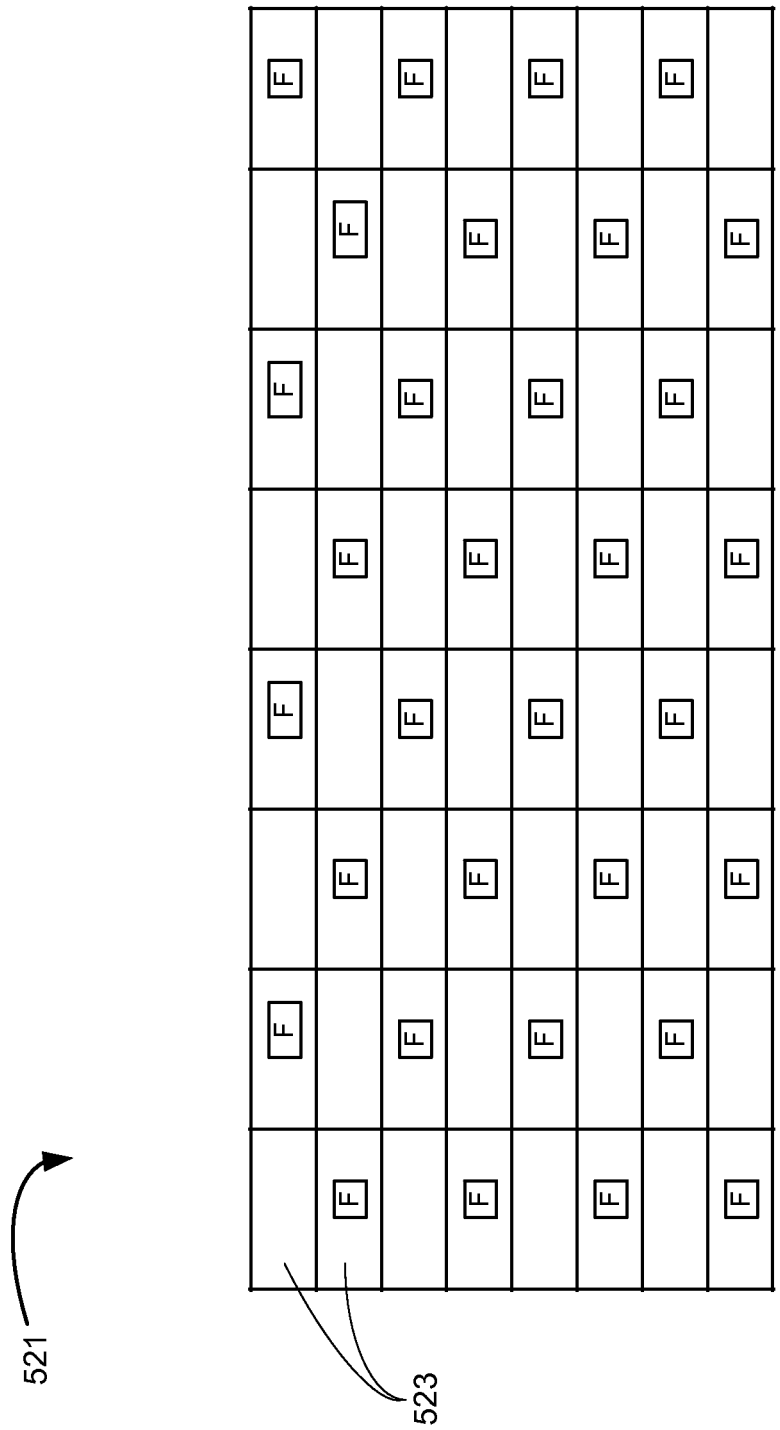
FIG. 5 is an example of structured image block flipping in a third embodiment of the present invention.

Referring now to FIG. 5, therein is shown an example of structured image block flipping in a third embodiment of the present invention. This example shows a schematic view of a base input image 521 as captured by the capture device 117 of FIG. 1. This example shows further the base input image 521 partitioned into base image blocks 523 which can each be organized into one of the input image block 220 of FIG. 2 by organizing each of the base image blocks 523 into one-dimensional blocks, for example. 50% of the base image blocks 523 can be marked for flipping, for example.

In this example, the positions of all of the base image blocks 523 are known. In such a situation, the pre-processing module 222 of FIG. 2 can take a structured approach to flipping or inverting a particular input image block. For example, the base image blocks 523, after conversion to the input image block 220, can be flipped in a checkerboard pattern. As can be seen in the figure, this can also be described as flipping the input image block 220 associated with every other position of the base image blocks 523. Because the positions of all of the base image blocks 523 are known, no additional information is necessary to mark which positions should be flipped again after decoding to restore the original orientation of the pixels. For example, all blocks in an odd or even-numbered block position could be flipped. In this example, the positions at which the input image block 220 should be flipped are marked with an "F" inside a box.

It is understood that at lower bitrates, it is possible to hit the bitbudget before all of the bitplanes 450 of FIG. 4 are scanned and coded. This means that not all of the bits in the bitplanes 450 are scanned and that consequently, information is lost during the coding (compression) process, and this loss of visual information can result in visual artifacts once a given image block is decompressed and displayed on a screen. It has been discovered that a structured approach to flipping the input image block 220 reduces the visibility of visual blocking artifacts. Because every instance of the input image block 220 undergoes a similar compression process, any blocking artifacts that show up due to hitting the bitbudget tend to also line up, making the visual blocking artifacts easily visible. Flipping some of the pixels of the input image block 220 also flips the priority of the bits which are scanned and coded during compression, which likely results in different visual blocking artifacts, for example. Once the flipping is reversed to generate the output image block 240 of FIG. 2, the visual blocking artifacts no longer line up and their visual prominence is reduced.

Figure 6:
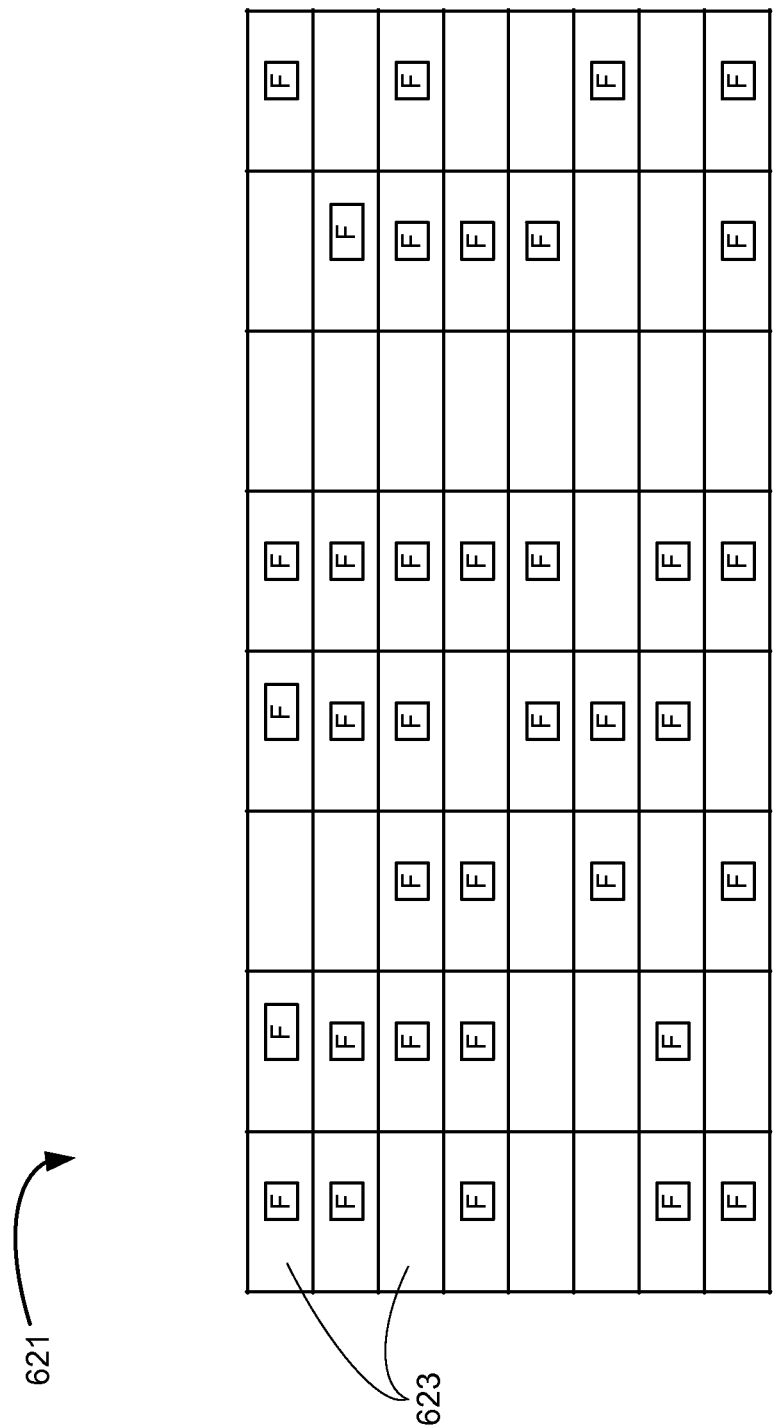
FIG. 6 is an example of random image block flipping in a fourth embodiment of the present invention.

Referring now to FIG. 6, therein is shown an example of random image block flipping in a fourth embodiment of the present invention. This example shows a schematic view of a base input image 621 as captured by the capture device 117 of FIG. 1. This example shows further the base input image 621 partitioned into base image blocks 623 which can each be organized into one of the input image block 220 of FIG. 2 by organizing each of the base image blocks 623 into one-dimensional blocks, for example. 50% of the base image blocks 623 can be marked for flipping, for example.

In this example, the positions of the base image blocks 623 are unknown. In such a situation, the pre-processing module 222 of FIG. 2 can take a random approach to flipping a particular input image block. For example, the positions of the base image blocks 623 can be flipped in a random pattern such that 50% of the positions of the base image blocks 623 have been marked for flipping once the input image block 220 has been generated. Because the positions of all of the base image blocks 623 are unknown, flipping can be signaled to the post-processing module 239 of FIG. 2 using a single bit in a bitstream to mark which positions should be flipped again after decoding to restore the original orientation of the pixels. In this example, the positions at which the input image block 220 should be flipped are marked with an "F" inside a box.

It is understood that at lower bitrates, it is possible to hit the bitbudget before all of the bitplanes 450 of FIG. 4 are scanned and coded. This means that not all of the bits in the bitplanes 450 are scanned and that consequently, information is lost during the coding (compression) process, and this loss of visual information can result in visual artifacts once a given image block is decompressed and displayed on a screen. It has been discovered that a random approach to flipping the input image block 220 reduces the visibility of visual blocking artifacts. Because every instance of the input image block 220 undergoes a similar compression process, any blocking artifacts that show up due to hitting the bitbudget tend to also line up, making the visual blocking artifacts easily visible. Flipping the pixels of the input image block 220 also flips the priority of the bits which are scanned and coded during compression, which likely results in different visual blocking artifacts, for example. Once the flipping is reversed to generate the output image block 240 of FIG. 2, the visual blocking artifacts no longer line up and their visual prominence is reduced.

Figure 7:
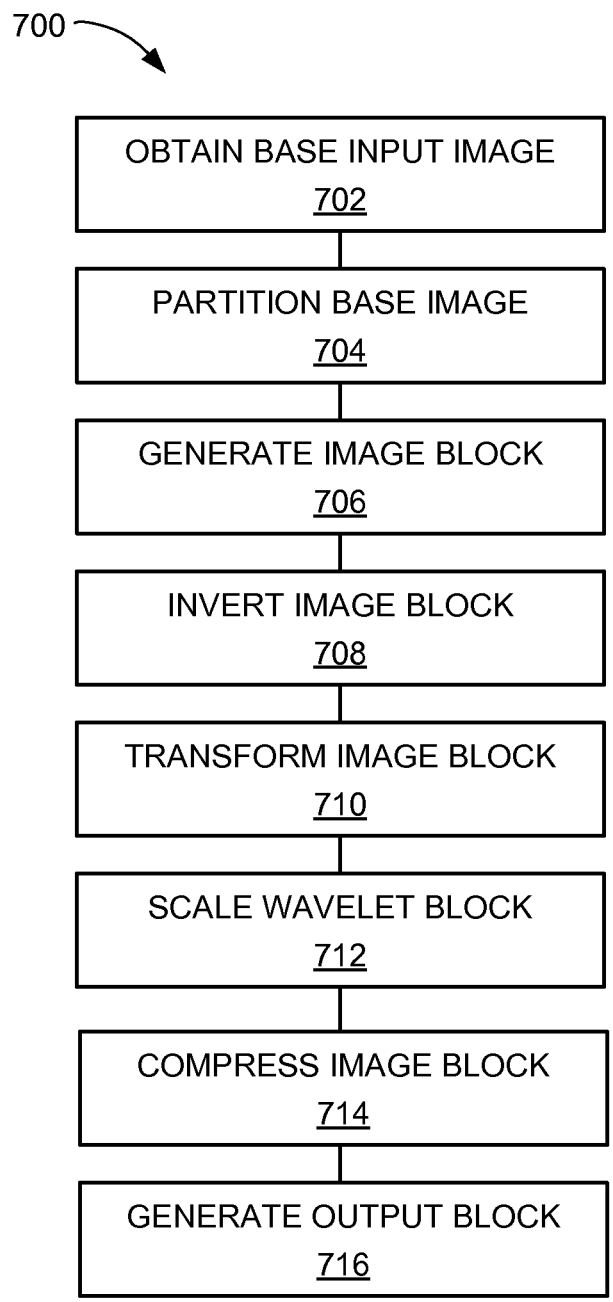
FIG. 7 is a flow chart of a method of operation of an image processing system in a further embodiment of the present invention.

Referring now to FIG. 7, therein is shown a flow chart of a method 700 of operation of an image processing system in a further embodiment of the present invention. The method 700 includes: obtaining a base input image with a capture device in a block 702; partitioning the base input image into base image blocks, each of the base image blocks having a position within the base input image in a block 704; generating an input image block based on the base image blocks, the input image block generated as a one-dimensional image block in a block 706; inverting the input image block associated with some of the positions within the base input image in a block 708; generating a transformed image block based on the input image block in a block 710; generating a scaled wavelet block based on the transformed image block with a scaling factor in a block 712; generating a compressed image block based on the scaled wavelet block in a block 714; and generating an output image block by decoding and performing an inverse wavelet transform on the compressed image block for display on a display device in a block 716.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
    obtaining a base input image with a capture device;
    partitioning the base input image into base image blocks, each of the base image blocks having a position within the base input image;
    generating an input image block based on the base image blocks, the input image block generated as a one-dimensional image block;
    inverting the input image block associated with some of the positions within the base input image;
    generating a transformed image block based on the input image block;
    generating a scaled wavelet block based on the transformed image block with a scaling factor;
    generating a compressed image block based on the scaled wavelet block; and
    generating an output image block by decoding and performing an inverse wavelet transform on the compressed image block for display on a display device.

2. The method as claimed in claim 1 further comprising:
    signaling the inversion of the input image block; and
    inverting the output image block before display based on the inversion of the input image block being signaled.

3. The method as claimed in claim 1 wherein inverting the input image block associated with some of the positions within the base input image includes inverting the input image block associated with 50% of the positions of the base image blocks.

4. The method as claimed in claim 1 wherein partitioning the base input image into base image blocks includes associating a position number with the position of each of the base image blocks.

5. The method as claimed in claim 1 inverting the input image block associated with some of the positions within the base input image includes randomly inverting the input image block associated with 50% of the positions of the base image blocks.

6. A method of operation of an image processing system comprising:
    obtaining a base input image with a capture device;
    partitioning the base input image into base image blocks, each of the base image blocks having a position within the base input image;
    generating an input image block based on the base image blocks, the input image block generated as a one-dimensional image block;
    inverting the input image block associated with 50% of the positions of the base image blocks within the base input image;
    signaling the inversion of the input image block;
    generating a transformed image block based on the input image block;
    generating a scaled wavelet block based on the transformed image block with a scaling factor;
    generating a compressed image block based on the scaled wavelet block;

generating an output image block by decoding and performing an inverse wavelet transform on the compressed image block for display on a display device; and inverting the output image block before display based on the inversion of the input image block being signaled.

7. The method as claimed in claim 6 wherein inverting the input image block associated with 50% of the positions of the base image blocks within the base input image includes inverting the input image block associated with every other position of the base image blocks in a checkerboard pattern.

8. The method as claimed in claim 6 wherein inverting the input image block includes inverting the order of the pixels of the input image block.

9. The method as claimed in claim 6 wherein generating the transformed image block based on the input image block includes using an integer-based wavelet transform on the input image block.

10. The method as claimed in claim 6 wherein signaling the inversion of the input image block includes using 1 bit to signal the input image block having an original orientation or a flipped orientation.

11. An image processing system comprising:
a capture device for obtaining a base input image; and
an image signal processing hardware coupled to the capture device, the image signal processing hardware including:
a pre-processing module for:
partitioning the base input image into base image blocks, each of the base image blocks having a position within the base input image,
generating an input image block based on the base image blocks, the input image block generated as a one-dimensional image block,
inverting the input image block associated with some of the positions within the base input image;
a wavelet transform module coupled to the pre-processing module for generating a transformed image block based on the input image block;
a coding module coupled to the wavelet transform module including a scaling correction module for generating a scaled wavelet block based on the transformed image block with a scaling factor, the coding module for generating a compressed image block based on the scaled wavelet block; and
a decoding module and an inverse wavelet transform module coupled to the coding module for generating an output image block by decoding and performing an inverse wavelet transform on the compressed image block for display on a display device.

12. The system as claimed in claim 11 wherein:
the pre-processing module is for signaling the inversion of the input image block; and
further comprising:
a post-processing module coupled to the inverse wavelet transform module for inverting the output image block before display based on the inversion of the input image block being signaled.

13. The system as claimed in claim 11 wherein the pre-processing module is for inverting the input image block associated with 50% of the positions of the base image blocks.

14. The system as claimed in claim 11 wherein the pre-processing module is for associating a position number with the position of each of the base image blocks.

15. The system as claimed in claim 11 wherein the pre-processing module is for randomly inverting the input image block associated with 50% of the positions of the base image blocks.

16. The system as claimed in claim 11 further comprising:
a post-processing module coupled to the inverse wavelet transform module for inverting the output image block before display based on the inversion of the input image block being signaled; and
wherein:
the pre-processing module is for:
inverting the input image block associated with 50% of the positions of the base image blocks, and
signaling the inversion of the input image block.

17. The system as claimed in claim 16 wherein the pre-processing module is for inverting the input image block associated with every other position of the base image blocks in a checkerboard pattern.

18. The system as claimed in claim 16 wherein the pre-processing module is for inverting the order of the pixels of the input image block.

19. The system as claimed in claim 16 wherein the wavelet transform module is for using an integer-based wavelet transform on the input image block.

20. The system as claimed in claim 16 wherein the pre-processing module is for using 1 bit to signal the input image block having an original orientation or a flipped orientation.

* * * * *